(No Model.)
J. A. LIGHTHALL.
FERTILIZER.
No. 408,491. Patented Aug. 6, 1889.
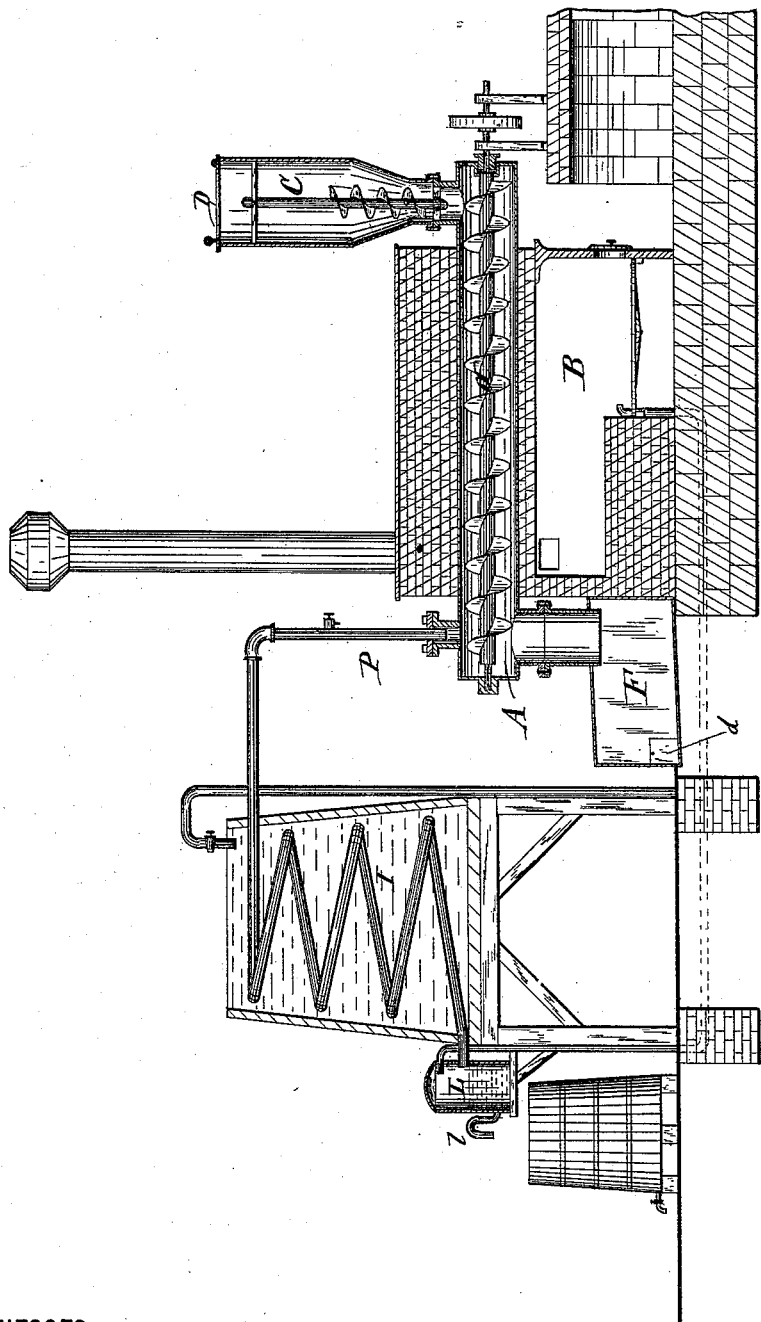
WITNESSES:
J. J. Laass
Mark W. Davey
INVENTOR
John A. Lighthall
BY
Duell, Laass & Duell
ATTORNEYS

UNITED STATES PATENT OFFICE.

JOHN A. LIGHTHALL, OF SYRACUSE, NEW YORK.

FERTILIZER.

SPECIFICATION forming part of Letters Patent No. 408,491, dated August 6, 1889.

Application filed June 30, 1888. Serial No. 278,648. (No specimens.)

*To all whom it may concern:*

Be it known that I, JOHN A. LIGHTHALL, of Syracuse, in the county of Onondaga, in the State of New York, have invented new and useful Improvements in Processes of Extracting Fertilizers from Tobacco-Stems, of which the following, taken in connection with the accompanying drawing, is a full, clear, and exact description.

The object of this invention is to obtain from tobacco-stems the chief ingredients which are useful as fertilizers of the soil, and to transform said ingredients into dry granular charcoal, which condition allows them to more thoroughly permeate the ground, and to also reduce the weight and bulk of said ingredients, and thus also reduce the expense of transportation of the same. To produce the aforesaid fertilizer I employ any suitable retort in which to char the tobacco-stems, so as to reduce them to a dry granular state, and suitable condensing apparatus in which to condense the volatile matter expelled from the stems, and thus afford proper vent from the retort without admitting air into the latter during the process of distillation.

The annexed drawing illustrates an apparatus adapted for treating the tobacco-stems so as to reduce them to the aforesaid condition.

A represents a retort, of the form of a horizontal cylinder, arranged over a furnace B, by which it is heated. A feed-hopper C is connected to one end and preferably provided with a closely-fitting door D, to exclude air during the process of distillation. A spiral conveyer $a$ in the cylinder A conveys gradually through the same the tobacco-stems to be charred. A receptacle or chamber F at the discharge end of the cylinder receives the charred substance. A pipe P conducts the volatile matter from said end of the cylinder to a suitable condenser I, and from thence the condensed matter passes to an air-tight receptacle L, in which to collect the products of distillation, said receptacle having its outlet $l$ trapped to prevent ingress of air.

In the treatment of the tobacco-stems I proceed as follows: I preferably first cut up the stems into small particles, and then introduce the same into the hopper C, taking care to close the same after it is filled. A conveyer in the hopper forces the cut-up stems into the cylinder or retort A, which is heated by fire in the furnace B. The conveyer $a$ is rotated at a moderate speed to convey the cut-up stems gradually through the retort and subject them to proper heat to char them, and by this destructive distillation expel therefrom all the volatile matter and reduce the tobacco-stems to a dry granular charcoal. The charred substance drops into the chamber F, which is provided with a suitable door $d$, through which to remove the charred substance, when desired. The aforesaid charred substance, which is collected in the chamber F, contains all the potash originally contained in the tobacco-stems, and is in a pulverable condition, which allows it to be easily distributed over the ground or over plants and to thoroughly permeate the ground.

This improved fertilizer has its weight and bulk reduced to a minimum, and can be readily packed in barrels or sacks convenient for storage and transportation, and the cost of transportation is consequently also greatly reduced.

What I claim as my invention is—

As a new article of merchandise, a fertilizer consisting of tobacco-stems reduced to dry granular charcoal, substantially as set forth.

In testimony whereof I have hereunto signed my name, in the presence of two witnesses, at Syracuse, in the county of Onondaga, in the State of New York, this 26th day of June, 1888.

JOHN A. LIGHTHALL. [L. S.]

Witnesses:
C. H. DUELL,
C. L. BENDIXON.